United States Patent
Ohshima et al.

(10) Patent No.: US 6,703,116 B2
(45) Date of Patent: Mar. 9, 2004

(54) CFRP COMPONENT FOR USE IN CONVEYOR WITH ITS PROCESSED SURFACE COATED AND METHOD OF COATING

(75) Inventors: Akio Ohshima, Yokohama (JP); Takashi Kobayashi, Yokohama (JP); Kenichi Aoyagi, Yokohama (JP); Daisuke Uchida, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/955,293

(22) Filed: Sep. 19, 2001

(65) Prior Publication Data

US 2003/0054151 A1 Mar. 20, 2003

(51) Int. Cl.$^7$ .......................... D04H 13/00; D04H 3/00; D04H 5/00; D02G 3/00; B32B 27/06; B32B 27/36; B65G 35/00; B25J 11/00
(52) U.S. Cl. ..................... 428/292.1; 428/375; 428/378; 428/480; 198/253; 198/619; 198/807; 427/385.5; 427/386; 427/387; 209/65
(58) Field of Search ................................ 428/375, 378, 428/480; 474/268; 198/807, 619, 253; 323/1; 209/63, 65; 901/7; 427/385.5, 386, 387

(56) References Cited

U.S. PATENT DOCUMENTS 4,868,050 A * 9/1989 Tanaka et al. ............... 428/335
5,158,289 A * 10/1992 Okumoto et al. ............. 273/80
5,169,710 A * 12/1992 Qureshi et al. .............. 428/246
5,211,893 A * 5/1993 Ebisawa et al. ............... 264/26
5,229,202 A * 7/1993 Tomono et al. ............. 428/288
5,344,689 A * 9/1994 Ide et al. .................... 428/114
5,591,784 A * 1/1997 Muranaka ..................... 522/74
5,653,331 A * 8/1997 Graf ........................... 198/807
5,916,682 A * 6/1999 Horii et al. .................. 428/408
6,277,771 B1 * 8/2001 Nishimura et al. .......... 442/229

FOREIGN PATENT DOCUMENTS

| JP | 62-124279 | | * | 6/1987 |
| JP | 8-288364 | A | | 11/1996 |
| JP | 11-354608 | A | | 12/1999 |
| JP | 2001-44259 | A | | 2/2001 |

* cited by examiner

Primary Examiner—Cynthia H. Kelly
Assistant Examiner—Camie S Thompson
(74) Attorney, Agent, or Firm—Kubovcik & Kubovcik

(57) ABSTRACT

An object is to provide a component made of CFRP for use in a conveyor, which component has been treated so as to hardly pollute precision apparatus components while making the best use of lightweight properties and high rigidity both inherent in CFRP, and a method of treating the component. A CFRP component for use in a conveyor, whose processed surface is coated with a resin which is resistant to a polar solvent and which cures at a low temperature of 90° C. or less. A method of coating a CFRP component for use in a conveyor, which comprises applying the resin diluted to be in a concentration of 5 to 60% by weight with a solvent onto a processed surface of the CFRP component for a conveyor, and then curing the resin applied at 90° C. or less.

6 Claims, No Drawings

CFRP COMPONENT FOR USE IN CONVEYOR WITH ITS PROCESSED SURFACE COATED AND METHOD OF COATING

BACKGROUND OF THE INVENTION

1. Technical Field

This invention relates to a component (member) made of CFRP (carbon fiber reinforced plastics) for use in a conveyor, whose processed surface was subjected to a coating treatment, and relates to a method of coating the processed surface, and in particular, this invention relates to a component subjected to a coating treatment, which is suitable for conveying precision apparatus components such as liquid crystal displays and silicone wafers, and relates to a method of coating the processed surface.

2. Description of the Prior Art

Carbon fiber reinforced plastics (hereinafter referred to as "CFRP") can be formed by impregnating carbon fibers with a matrix resin to form prepregs, then laminating the prepregs to form a laminate and then by curing the laminate at a suitable temperature.

CFRP are used in products for sports and leisure such as golf shafts, fishing rods and tennis rackets; industrial components such as products for use in an aircraft, printing ink rolls, pressure vessels and components for use in industrial robots; civil engineering materials such as materials for repairing bridges and materials for civil engineering repairing, and as liquid crystal displays become more large-sized in recent years, CFRP, which are lightweight and highly rigid, come to be used as components used in industrial robots for conveying the precision apparatus components instead of conventional metal materials such as aluminum.

Incidentally, the majority of precision apparatus components are apt to be extremely damaged by pollution with a dust, so that a CFRP component for a conveyor should be a component which does not pollute the precision apparatus components. Further, before the CFRP component for a conveyor is used, a dust on the CFRP component is wiped off in many cases with a cloth impregnated with a polar solvent such as an alcohol solvent or an acetone solvent, but a processed surface of the CFRP component for a conveyor has exposed carbon fibers and is easily damaged by a wipe with the cloth impregnated with the polar solvent, and thus precision apparatus components can be polluted with fine carbon particles generated from the carbon fibers.

SUMMARY OF THE INVENTION

An object of this invention is to provide a component made of CFRP for use in a conveyor, which component has been treated so as to overcome problems mentioned above and to hardly pollute precision apparatus components while making the best use of lightweight properties and high rigidity both inherent in CFRP, and a method of treating the component.

That is, the first aspect of this invention provides a CFRP component for use in a conveyor, whose processed surface is coated with a resin which is resistant to a polar solvent and which cures at a low temperature of 90° C. or less.

The second aspect of this invention provides a method of coating a CFRP component for use in a conveyor, which comprises applying the above resin diluted to be in a concentration of 5 to 60% by weight with a solvent onto a processed surface of the CFRP component for a conveyor, and then curing the resin applied at 90° C. or less.

DESCRIPTION OF THE PREFERRED EMBODIMENTS

According to this invention, the resin which is resistant to a polar solvent and which cures at a low temperature of 90° C. or less (hereinafter referred to as "coating resin") includes a silicon resin (a moisture-curing silicon resin, a silicon resin modified with alkyd, a silicon resin modified with epoxy, a silicon resin obtained by addition reaction), an alkyd resin, an unsaturated polyester resin (a peroxide-curing unsaturated polyester resin, an ultraviolet-curing unsaturated polyester resin), an alkyd resin modified with oil, a cyanoacrylate resin (a moisture-curing cyanoacrylate resin), an acrylic resin, a polyurethane resin (an alkyd polyol type polyurethane resin, an acryl polyol type polyurethane resin, a polyester polyol type polyurethane resin), an epoxy resin (an amine-curing epoxy resin, an ultraviolet-curing epoxy resin, a room temperature-intermediate temperature curing epoxy resin), a phenol resin, an epoxy alkyd resin, an epoxy ester resin, a resol/p-toluenesulfonic acid-curing phenol resin or a mixture of two or more resins selected from the above resins.

For example, the mixing ratio by weight of two resins selected from the above resins is preferably from 1:0.05 to 0.05:1.

In particular, the acrylic resin, the ultraviolet-curing epoxy resin, the room temperature-intermediate temperature curing epoxy resin, the moisture-curing silicon resin or a mixture of two or more of them is preferable because they have excellent resistance to a wipe with a polar solvent.

According to this invention, the matter that "the coating resin is resistant to a polar solvent" means that even if a surface coated with a resin cured is wiped with a cloth (e.g. a dust-free clean cloth (a polyester knit)) impregnated with a polar solvent (e.g. ethanol), the surface coated does not melt, does not swell and does not become sticky, and a dust such as fine carbon particles originating in carbon fibers is not substantially scattered from the component for a conveyor, and also means that the cloth used for wiping the surface coated with the resin cured and the surface coated are not substantially polluted with the fine carbon particles and the like.

The polar solvent referred to in this invention includes an acetone solvent or an alcohol solvent, such as acetone, diethyl ketone, methyl ethyl ketone, methanol, ethanol, isopropyl alcohol and a mixture thereof.

The polyurethane resin includes two-pack resin compounds comprising acryl polyol blended with monomers and adducts such as tolylene diisocyanate, 4,4'-diphenyl methane diisocyanate, hexamethylene diisocyanate, isophorone diisocyanate and polymethylene polyphenyl polyisocyanate. The isocyanates may be any commercially available ones, but in consideration of handling, the isocyanates are preferably the adducts.

A marketing product of the adduct includes CORONATE T-100, MILLIONATE MT, MILLIONATE MR-200 (trade name in each instance, produced by NIPPON POLYURETHANE INDUSTRY CO., LTD.). The acryl polyol includes DESMOPHEN A160X, DESMOPHEN A265 (trade name in each instance, produced by SUMITOMO BAYER URETHANE CO., LTD.), and TAKELAC UA-702, TAKELAC UA-902 (trade name in each instance, produced by TAKEDA CHEMICAL INDUSTRIES, LTD.).

The acrylic resin includes polyester acrylate, urethane acrylate, polyether acrylate, epoxy acrylate, polybutadiene acrylate, silicone acrylate, acryl acrylate and a mixture of two or more of these acrylates.

The coating resins can be cured at room temperature or with ultraviolet irradiation by adding a peroxide for room temperature curing or a catalyst for ultraviolet-curing to the coating resins.

The peroxide for room temperature curing includes diacyl peroxide, peroxy dicarbonate, peroxy ester and a mixture thereof, and these peroxides can be used in combination with a cobalt naphthenate accelerator. The catalyst for ultraviolet-curing includes aromatic diazonium salts, aromatic iodonium salts, aromatic sulfonium salts, metallocene compounds and a mixture thereof.

The epoxy resin is preferably a room temperature-intermediate temperature curing epoxy resin and an ultraviolet-curing epoxy resin.

The room temperature-intermediate temperature curing epoxy resin referred to in this invention is an epoxy resin curing usually at 10 to 90° C., preferably 20 to 80° C. If the resin cures at 90° C. or less, the CFRP component can be prevented in its thermal deformation.

The room temperature-intermediate temperature curing epoxy resin preferably includes epoxide reaction products of an alicyclic amine and/or an aromatic amine with an epoxy resin.

The alicyclic amine preferably includes menthene diamine, isophorone diamine, bis(4-amino-3-methyldicyclohexyl)methane, diaminodicyclohexyl methane, bis(aminomethyl)cyclohexane, N-aminoethyl piperazine, norbornane diamine, 3,9-bis(3-aminopropyl)2,4,8,10-tetraoxaspiro(5,5)undecane and Mannich addition compounds thereof.

The aromatic amine includes m-xylylene diamine, α-(aminophenyl)ethylamine and Mannich addition compounds thereof, and also includes a mixture of two or more of the amines.

The Mannich addition compounds can be obtained, for instance, by mixing phenol with an alicyclic amine and/or an aromatic amine to obtain a mixture and then heating the mixture obtained up to 80 90° C. while adding formalin thereto with stirring.

An epoxy resin allowed to react with the alicyclic amine and with the aromatic amine may be any usual epoxy resin, but an epoxy resin in a liquid form at ordinary temperature is preferable because it is easy to handle, and for example a liquid bisphenol type epoxy resin, a liquid alicyclic epoxy resin or a mixture thereof can be used as the epoxy resin.

A mixing amount of the epoxy resin with the amine is not particularly limited, but usually 5 to 50 parts by weight of the epoxy resin can be mixed per 10 parts by weight of the amine.

Among cured products of room temperature curing epoxy resins, a cured product of an epoxide reaction product of aliphatic amine polyaminoimide and aliphatic amine polyamine with an epoxy resin, is not preferable because it is not resistant to a solvent such as alcohol.

The ultraviolet-curing epoxy resin includes, for example, a liquid bisphenol type epoxy resin, an alicyclic epoxy resin or a mixture thereof. The aromatic diazonium salts, the aromatic iodonium salts, the aromatic sulfonium salts, the metallocene compounds and a mixture thereof can be added as curing catalysts to the ultraviolet-curing epoxy resin.

The curing catalyst for the ultraviolet-curing epoxy resin includes San-ade SI (trade name, produced by SANSHIN CHEMICAL INDUSTRY, LTD.) and ADEKAOPTON CP-66 (trade name, produced by ASAHI DENKA KOGYO K.K.).

The liquid bisphenol type epoxy resin includes EPI-COTE807 (trade name, produced by JAPAN EPOXY RESINS CO., LTD.), EPOTOHTO YDF170 (trade name, produced by TOHTO KASEI CO., LTD.), EPICLON830 (trade name, produced by DAINIPPON INK AND CHEMICALS INCORPORATED), EP-4900 (trade name, produced by ASAHI DENKA KOGYO K.K.), PY-306 (trade name, produced by ASAHI CIBA CO., LTD.), EPICOTE825, EPICOTE828, EPICOTE190 and EPICOTE RX-21 (trade name in each instance, produced by JAPAN EPOXY RESINS CO., LTD.).

The alicyclic epoxy resin includes CELOXIDE2021, CELOXIDE2021A, CELOXIDE2021P, CELOXIDE2080, CELOXIDE3000, EHPE3150 (trade name in each instance, produced by DAICEL CHEMICAL INDUSTRIES, LTD.), AK-601 (trade name, produced by NIPPON KAYAKU CO., LTD.), RIKARESIN HBE100, RIKARESIN DME-100 (trade name in each instance, produced by NEW JAPAN CHEMICAL CO., LTD.), CY175, CY177, CY179, CY184, CY192 (trade name in each instance, produced by CIBA-GEIGY JAPAN, LTD.), ERL4234, ERL4221, ERL4206 and ERL4299 (trade name in each instance, produced by UNION CARBIDE CORPORATION).

The silicon resin includes a silicon resin modified with alkyd, a silicon resin modified with epoxy, a moisture-curing alcohol type silicon resin, a moisture-curing oxime type silicon resin, an addition reaction type silicon resin or a mixture of two or more of them, among which a moisture-curing silicon resin, i.e., the moisture-curing alcohol type silicon resin, the moisture-curing oxime type silicon resin or a mixture thereof is preferable.

The silicon resin modified with epoxy includes BY16-855D, SF8411, SF8413 and BY16-839 (trade name in each instance, produced by TORAY DOW CORNING SILICONE CO., LTD.).

The moisture-curing alcohol type silicon resin includes SR2410, SR2406, SR2420, SR2416 (trade name in each instance, produced by TORAY DOW CORNING SILICONE CO., LTD.), and KE4895 (trade name, produced by SHIN-ETSU CHEMICAL CO., LTD.).

A curing catalyst for the above-mentioned moisture-curing alcohol type silicon resin includes dibutyltin diacetate, dibutyltin dilaurate and a mixture thereof.

The moisture-curing oxime type silicon resin includes SR2405, SR2411 (trade name in each instance, produced by TORAY DOW CORNING SILICONE CO., LTD.), and KE445 (trade name, produced by SHIN-ETSU CHEMICAL CO., LTD.).

A curing catalyst for the above-mentioned moisture-curing oxime type silicon resin includes dibutyltin diacetate, dibutyltin dilaurate and a mixture thereof, similarly to the catalyst for the above-mentioned moisture-curing alcohol type silicon resin.

As a method of coating a CFRP component for use in a conveyor according to this invention, it is preferable to employ a method of applying the coating resin diluted to be in a concentration of 5 to 60% by weight with a solvent onto a processed surface of the CFRP component for a conveyor, and then curing the resin applied at 90° C. or less. According to this method, there can be obtained a CFRP component for use in a conveyor, whose processed surface is coated with a resin (coating resin) which is resistant to a polar solvent and which cures at a low temperature of 90° C. or less, The CFRP component for a conveyor according to this invention may have any shapes.

A fumed silica can be added to the coating resin, but an amount of the fumed silica added is not particularly limited.

The fumed silica includes those marketed in the trade names of AEROSIL 50, AEROSIL 130, AEROSIL 200, AEROSIL 200V, AEROSIL 200CF, AEROSIL 200FAD, AEROSIL 300, AEROSIL 300CF, AEROSIL 380, AEROSIL R972, AEROSIL R972V, AEROSIL R972CF, AEROSIL R974, AEROSIL R202, AEROSIL R805, AEROSIL R812, AEROSIL R812S, AEROSIL RX200 and AEROSIL RY200 (produced by AEROSIL JAPAN CO., LTD.).

The coating resin can be used usually after being suitably diluted with a solvent, and the concentration of the coating resin diluted can be 5 to 60% by weight, preferably 10 to 30% by weight.

A solvent for dilution includes toluene, xylene, ligroin, n-heptane, mineral sprit, Cellosolve acetate and a mixture thereof.

If the concentration of the coating resin diluted with the solvent is lower than 5% by weight, a coat obtained by applying the coating resin diluted onto the processed surface is thin, while if the concentration is higher than 60% by weight, after the coating resin applied is cured the surface of the component becomes uneven due to uneven coating, and those are problems.

The processed surface referred to in this invention indicates a portion where carbon fibers of CFRP are exposed by processing etc., and specifically indicates a cut surface, a ground surface, an R-processed surface, a holed surface, a thinly processed surface etc.

A method of applying the coating resin is not particularly limited, and insofar as the processed surface of the CFRP component for a conveyor can be coated with the coating resin, any methods of applying the coating resin can be suitably used, and brushing, spray coating, roll coating and the like can usually be used.

A coating layer obtained by applying and curing the coating resin diluted with the solvent can usually has 5 to 30 $\mu$m in thickness. When the thickness exceeds 30 $\mu$m, the coating layer is slow to dry and dripping occurs to cause unevenness, while if the thickness is lower than 5 $\mu$m, the effect of coating is insufficient, which are both undesirable.

The curing temperature of the coating resin is 10 to 90° C., preferably 20 to 80° C., more preferably 20 to 70° C., and if the coating resin is not cured at temperature lower than these temperatures, the component for a conveyor or parts used therein may be warped or deformed due to heat, and after the component is attached to an industrial robot, the component can not be coated with the coating resin.

EXAMPLES

Hereinafter, this invention is illustrated in more detail by reference to Examples, which however are not intended to limit this invention.

Example 1

The end of a CFRP plate was subjected to 2 mm R-processing to form a processed surface at the end. The CFRP plate had 1000 mm in length, 100 mm in width and 8 mm in thickness, and the CFRP plate had a mounting hole and a vacuum pad-mounting hole both having 6 mm in inner-diameter, and a groove having 6 mm in width and 2 mm in depth.

The processed surface was wiped with a dust-free clean cloth (a polyester knit) impregnated with ethanol, and then it was coated by a brush with a moisture-curing alcohol type silicon coating agent SR2410 (produced by TORAY DOW CORNING SILICONE CO., LTD., 20% by weight in resin concentration, solvent: ligroin). The silicon coating agent applied was dried, then in order to sufficiently accelerate the curing of the coating agent, the coating agent was cured in an oven at 50° C. for 1 hour, and thus there was formed no uneven coat on the processed surface.

Thereafter, the surface coated was sufficiently wiped with a dust-free clean cloth (a polyester knit) impregnated with ethanol, then no stain was observed on the surface coated of CFRP and on the clean cloth.

Example 2

In place of SR2410, a mixture of 20 parts by weight of norbornane diamine (produced by MITSUI CHEMICALS INC.) and 100 parts by weight of EPICOTE828 (produced by JAPAN EPOXY RESINS CO., LTD.) was diluted to be in a resin concentration of 30% by weight with a mixed solvent of toluene/MEK (ratio of 1:2 by weight) to give a diluted coating resin.

A processed surface of CFRP, which had been treated in the same manner as in Example 1, was coated by a brush with the diluted coating resin. The resin applied was cured in an oven at 60° C. for 1 hour, and as a result, there was formed no uneven coat on the processed surface, and when the surface coated was sufficiently wiped with a dust-free clean cloth (a polyester knit) impregnated with ethanol, no stain was observed on the surface coated of CFRP and on the clean cloth.

Example 3

A four-necked flask in a volume of 2 L equipped with an agitating element, a reflux condenser, an inlet for nitrogen and a thermometer was charged with phenol in an amount of 282 g and m-xylylene diamine in an amount of 408 g, and they were mixed to obtain a mixture and then the mixture was heated to 80 90° C. Formalin in a concentration of 37% and in a volume of 180 ml was added to the above mixture over about 1 hour with stirring.

Thereafter, the mixture was heated to 100° C., and those compounds were allowed to react with each other for 2 hours and then heated for about 2 hours to 160° C. with dehydration to finish the reaction. A resulting epoxy resin curing agent component based on a Mannich addition compound of m-xylylene diamine had viscosity of 900 mPa·s/25° C. and an amine number of 495 mg KOH/g. The epoxy resin curing agent component was introduced into a can in a volume of 2 L equipped with a lid.

The above epoxy resin curing agent component based on a Mannich addition compound of m-xylylene diamine in an amount of 50 parts by weight was uniformly mixed with 100 parts by weight of an epoxy resin EPICOTE828 (produced by JAPAN EPOXY RESINS CO., LTD.) to obtain a mixture, and further the mixture was diluted to be in a resin concentration of 30% by weight with a mixed solvent of toluene/MEK (ratio of 1:2 by weight) to give a diluted coating resin.

A processed surface of CFRP, which had been treated in the same manner as in Example 1, was coated by a brush with the diluted coating resin. The resin applied was cured in an oven at 60° C. for 1 hour, and as a result, there was formed no uneven coat on the processed surface, and when the surface coated was sufficiently wiped with a dust-free clean cloth (a polyester knit) impregnated with ethanol, no stain was observed on the surface coated of CFRP and on the clean cloth.

Comparative Example 1

A cold-setting modified epoxy resin {EPICOTE828 (produced by JAPAN EPOXY RESINS CO., LTD.)/FXK- 825 (trade name, epoxy resin curing agent modified with aliphatic amine, produced by FUJI KASEI KOGYO CO., LTD.)=a ratio of 100/40 by weight} was diluted to be in a resin concentration of 30% by weight with a mixed solvent of toluene/MEK (ratio of 1:2 by weight) to give a diluted coating resin. A processed surface of CFRP, which had been treated in the same manner as in the Examples, was coated by a brush with the diluted coating resin, and then left for 1 day. The diluted resin applied was sufficiently cured, but when the surface coated was sufficiently wiped with a dust-free clean cloth (a polyester knit) impregnated with ethanol, the surface coated swelled and turned sticky, and a dust easily adhered to the clean cloth. This means that the surface will pollute precision apparatus components and the like which are conveyed.

According to the CFRP component for use in a conveyor of this invention, there is caused no pollution on precision apparatus components with carbon particles originating in carbon fibers, and it is possible to sufficiently demonstrate lightweight properties and high rigidity that are inherent in the CFRP component for a conveyor.

Further, according to the method of coating a CFRP component for use in a conveyor of this invention, the surface of the component after coated with the coating resin is smooth, and simultaneously the component for a conveyor is not warped and is not deformed, and even after the component is attached to a conveying robot, the component can also be subjected to coating treatment.

What is claimed is:

1. A conveyor for an industrial robot, comprising a CFRP component in the form of the conveyor and having a processed surface coated with a resin which is resistant to a polar solvent and which cures at a low temperature of 900° C. or less, wherein said resin is at least one member selected from the group consisting of (a) a room temperature-intermediate temperature curing epoxy resin which cures at 10 to 900° C. and is selected from an epoxide reaction product of an alicyclic amine with an epoxy resin; an epoxide reaction product of an aromatic amine with an epoxy resin; an epoxide reaction product of an alicyclic amine and an aromatic amine with an epoxy resin; (b) at least one ultraviolet-curing epoxy resin selected from a liquid bisphenol epoxy resin and an alicyclic epoxy resin mixed with at least one curing catalyst selected from aromatic diazonium salts, aromatic iodonium salts, aromatic sulfonium salts and metallocene compounds; (c) at least one moisture-curing silicone resin selected from a moisture-curing alcohol silicone resin and a moisture-curing oxime silicone resin mixed with a curing catalyst; and (d) at least one acrylic resin selected from polyester acrylate, urethane acrylate, polyether acrylate, epoxy acrylate, polybutadiene acrylate, silicone acrylate and acryl acrylate mixed with a peroxide for room temperature curing.

2. The conveyor for an industrial robot according to claim 1, wherein said alicyclic amine is one member selected from the group consisting of menthene diamine, isophorone diamine, bis(4-amino-3-methyldicyclohexyl) methane, diaminodicyclohexyl methane, bis(aminomethyl) cyclohexane, N-aminoethyl piperazine, norbornane diamine, 3,9-bis(3-aminopropyl)2,4,8,10-tetraoxaspiro(5,5) undecane and Mannich addition compounds thereof.

3. The conveyor for an industrial robot according to claim 1, wherein said aromatic amine is at least one member selected from the group consisting of m-xylylene diamine, α-(aminophenyl) ethylamine and Mannich addition compounds thereof.

4. The conveyor for an industrial robot according to claim 1, wherein the curing catalyst which is mixed with the moisture-curing silicone resin is at least one member selected from dibutyltin diacetate and dibutyltin dilaurate.

5. The conveyor for an industrial robot according to claim 1, wherein the peroxide for room temperature curing is at least one member selected from diacyl peroxide, peroxy dicarbonate and peroxy ester.

6. The conveyor for an industrial robot according to claim 1, wherein a coating layer made of said resin has a thickness of 5 to 30 $\mu$m.

* * * * *